Sept. 20, 1960     E. W. GLOVER     2,952,999
SHAFT CONNECTIONS
Filed July 2, 1958
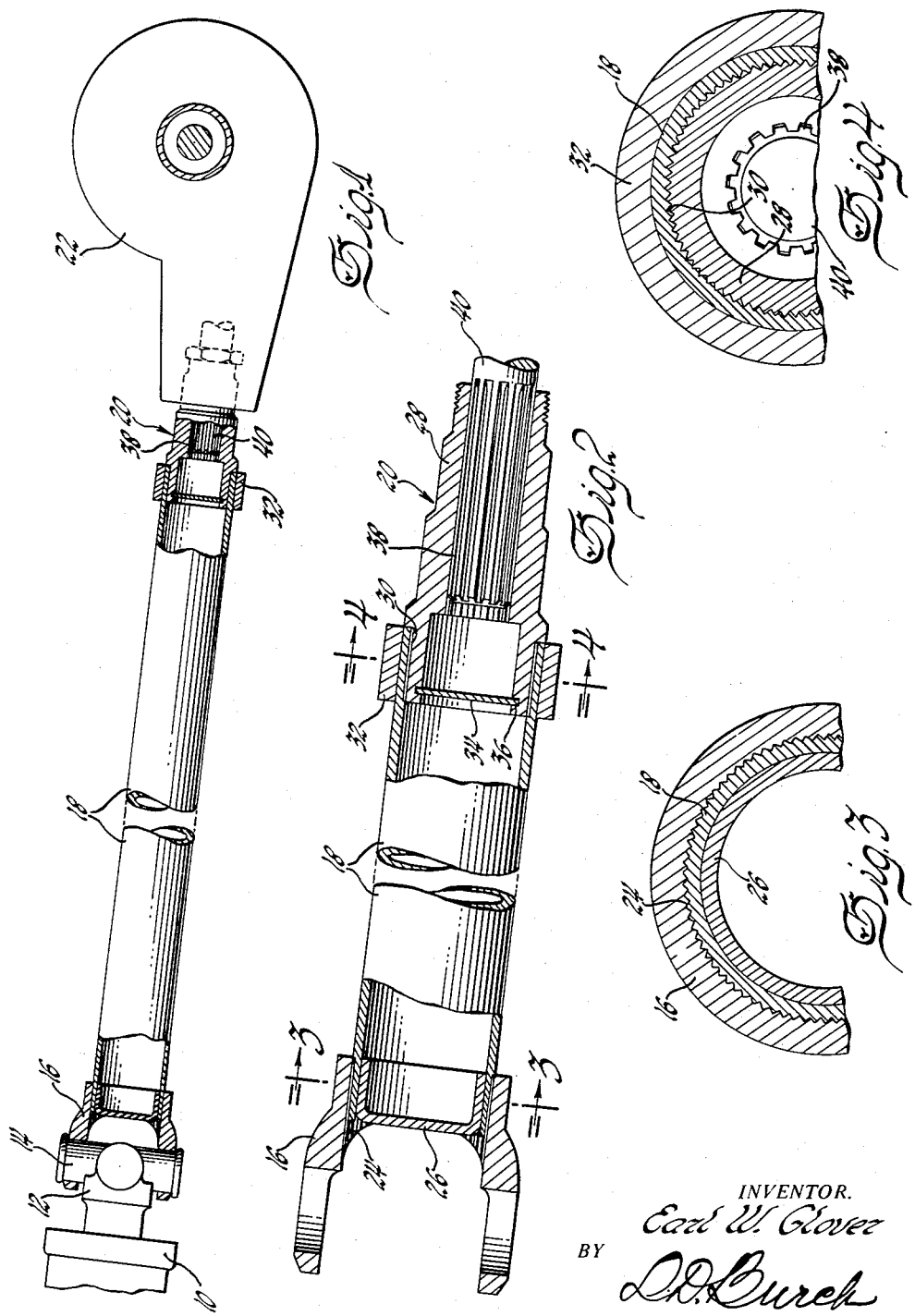
INVENTOR.
Earl W. Glover
BY
D. D. Burch
ATTORNEY United States Patent Office 2,952,999
Patented Sept. 20, 1960

2,952,999

SHAFT CONNECTIONS

Earl W. Glover, Saginaw, Mich., assignor to General Motors Corporation, Detroit, Mich., a corporation of Delaware Filed July 2, 1958, Ser. No. 746,236

5 Claims. (Cl. 64—1)

This invention relates to shaft connections, and more particularly to a rigid torque transmitting connection between a drive shaft and a universal yoke, or the like, at one end and a differential drive pinion, or the like, at the other end.

In the usual torque transmitting connections, such as those in motor vehicle drive lines, a tubular shaft is welded to the connecting members to provide the rigid joint. In drive lines, the tubular drive shaft is generally of a softer material than the connecting universal joint section or the differential drive pinion assembly. This construction presents numerous problems in the strength and durability of the connections and the drive line.

The device in which this invention is embodied comprises a rigid torque transmitting connection between a tubular shaft, as a motor vehicle drive shaft, and its connecting portions, such as a universal joint section or differential drive pinion assembly, that is far superior to welded connections used in the past. In making the connection, welding operations are eliminated, and no heating of the metal is required. Thus, the weakening effects brought about by the annealing of the metal are avoided, and the metallurgical problems attendant in welding a high carbon steel member to a low carbon member are eliminated. The resulting connection is of a greater strength than a welded connection, providing a cheaper construction and requiring much less operator effort to assemble.

In the drawings:

Figure 1 is an elevational view of a portion of a motor vehicle drive line with parts broken away and in section to illustrate the invention.

Figure 2 is an enlarged view of a portion of Figure 1 with parts broken away and in section to illustrate the joints.

Figure 3 is a cross sectional view of one of the drive shaft connections of Figure 1 taken substantially along the line 3—3 of Figure 2 and looking in the direction of the arrows.

Figure 4 is a cross sectional view of a second joint of Figure 1, taken substantially along the line 4—4 of Figure 2, and looking in the direction of the arrows.

The invention is best illustrated in applying it to a motor vehicle drive line, as it is hereinafter discussed. However, it is not intended to limit this invention to motor vehicles or to motor vehicle drive lines, as it is applicable to any connection utilizing a tubular member.

Referring more particularly to the drawings, a motor vehicle drive line is illustrated in Figure 1. At the forward end, a portion of a transmission unit 10 is shown having a universal yoke 12 connected thereto. A conventional trunnion and bearing assembly 14 is secured to the universal joint section 12 and is received in the universal joint section 16. A tubular drive shaft member 18 is connected to the universal yoke 16, as will be later described, and extends rearwardly to join a differential drive pinion assembly 20, driving the differential unit 22. The connection between the drive shaft 18 and the differential drive pinion assembly 20 will also be hereinafter described.

Referring to Figure 2, the universal yoke section 16 has a plurality of shallow splines in its internal bore, as at 24. The tubular drive shaft 18 is of slightly greater outside diameter than the internal diameter of the splines 24 and the tubular drive shaft 18 is conventionally formed of softer material than the universal yoke 16. The smooth end of the drive shaft 18 may be forced into the splined portion of the universal yoke 16 and a retaining cap 26 forced into the end of the tubular shaft. Referring to Figure 3, the resulting assembly is as shown, the universal yoke section 16 having the internal splines 24 formed therein and the tubular drive shaft 18, being of greater diameter than the internal diameter of the splines. Being of softer material than the universal yoke, the drive shaft firmly sets itself within the splines, the metal of the drive tube being distorted into the depressions of the splined universal yoke. The retainer cap 26 serves to further force the drive tube into the splined portion of the universal yoke.

Referring again to Figure 2, the differential drive pinion assembly 20 is shown connected to the drive shaft 18. The stub shaft 28 has an external shallow splined portion 30 which is insertable in the smooth end of the drive tube 18. The inner diameter of the drive tube 18 is slightly less than the outer diameter of the splines 30, such that the forcing of the tube over the stub shaft 28 will distort the metal of the tube into the depressions between the splines in the stub shaft. A retainer sleeve 32 is placed about the outer surface of the drive tube, adjacent the splined connection, to further force the drive tube into the splines and maintain a rigid joint. In Figure 4 the cross section of this joint is illustrated, the stub shaft 28 having the external splines 30 embedded in the metal of the tube 18 and the retaining sleeve 32 secured about the joint.

To prevent the leakage of oil from the differential unit 22 into the tubular drive shaft 18, a seal 34 is disposed in the stub shaft bore and seated in grooves 36. The stub shaft is spline connected, as at 38, to the differential drive pinion 40.

Thus, a torque transmitting drive line is provided between a transmission unit and a differential unit without the use of welding procedures and the resulting metallurgical disadvantages.

I claim:

1. A shaft connection comprising a tubular member having a plurality of shallow internal splines, a tubular shaft having a smooth outer surface and having an outside diameter greater than the inside diameter of said splines, said shaft being received in said tubular member at the splined portion thereof, and a retainer cap receivable in said tubular shaft adjacent said splines and forcing said tubular shaft into engagement with said splines and providing a locked torque transmitting connection between said tubular member and said tubular shaft.

2. A shaft connection comprising a first shaft member having a plurality of shallow external splines formed at one end thereof, a tubular second shaft member having a smooth inner surface and an inside diameter less than the outside diameter of said splines on said splined portion of said first shaft member, said second shaft member receiving said splined portion of said first shaft member within said smooth portion thereof, and a retainer sleeve received about said second shaft member and said first shaft member and forcing said smooth portion of said second shaft member into said splines in said first shaft member and providing a locked torque transmitting connection therebetween.

3. In a motor vehicle, a universal yoke having a shallow splined axial bore, a tubular drive shaft having a smooth outer surface of greater diameter than the internal diameter of said splined bore, said drive shaft being received in said bore, and a retainer cap received in said tubular drive shaft and forcing said drive shaft into engagement with said splines in said universal yoke and providing a locked torque transmitting connection between said universal yoke and said drive shaft.

4. In a motor vehicle, a stub shaft having a plurality of external shallow splines formed thereon, a tubular drive shaft having a smooth internal surface of less diameter than the outside diameter of said splines on said stub shaft, said stub shaft being received in said tubular drive shaft, and a retaining sleeve engaging the external surface of said drive shaft adjacent said splined stub shaft and forcing said drive shaft into engagement with said splines and providing a locked torque transmitting connection between said drive shaft and said stub shaft.

5. In a motor vehicle drive line comprising a universal yoke at one end thereof, a differential drive pinion stub shaft at the other end thereof, a tubular drive shaft disposed between said universal yoke and said differential drive pinion stub shaft and connected thereto, said universal yoke having a shallowly splined internal bore, said drive shaft having a smooth end of greater outside diameter than the diameter of said shallow splines and received in said splined bore, a retainer cap received in the end of said drive shaft within said splined bore, a shallow spline portion formed on the outer surface of said stub shaft adjacent said drive shaft, a smooth interior end on said drive shaft being of less inside diameter than the diameter of said last mentioned splines and engaged on the splined portion of said stub shaft, and a sleeve received over the end of said drive shaft engaged on said stub shaft, said retainer cap and said sleeve providing locked torque transmitting joints between said drive shaft and said universal yoke and between said drive shaft and said stub shaft.

References Cited in the file of this patent
UNITED STATES PATENTS

| | | |
|---|---|---|
| 1,490,649 | Vanderbeek | Apr. 15, 1924 |
| 1,678,640 | Hall | July 21, 1928 |
| 1,760,845 | Kettering et al. | May 27, 1930 |
| 2,052,241 | Morgan | Aug. 25, 1936 |
| 2,072,090 | Anderson | Mar. 2, 1937 |
| 2,345,910 | Fawcett | Apr. 4, 1944 |
| 2,380,952 | Dewey | Aug. 7, 1945 |